(No Model.)
T. B. JEFFERY.
WHEEL TIRE.
No. 444,069.
Patented Jan. 6, 1891.
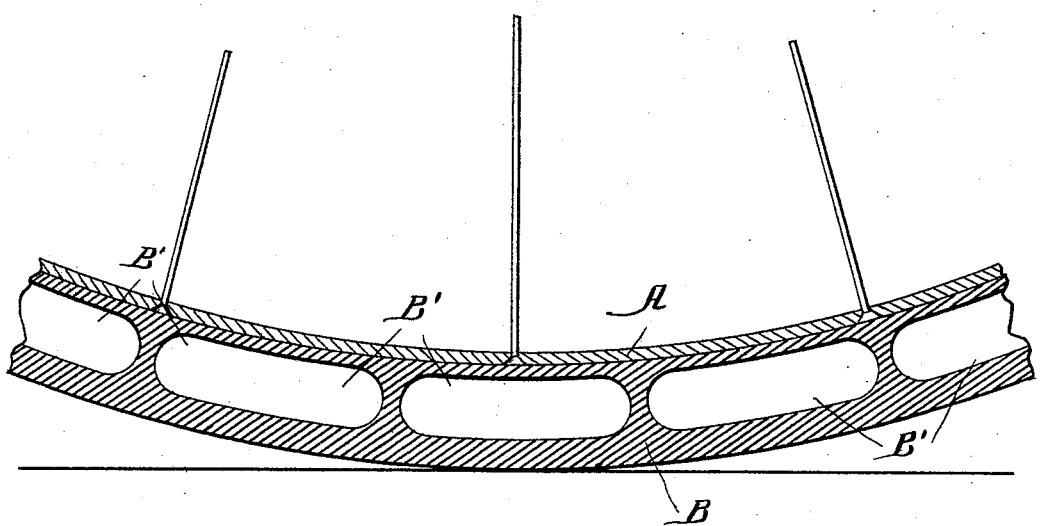
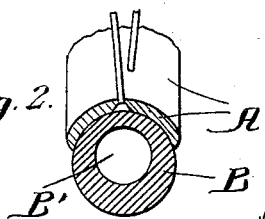

UNITED STATES PATENT OFFICE.

THOMAS B. JEFFERY, OF CHICAGO, ILLINOIS.

WHEEL-TIRE.

SPECIFICATION forming part of Letters Patent No. 444,069, dated January 6, 1891.

Application filed September 8, 1890. Serial No. 364,260. (No model.)

*To all whom it may concern:*

Be it known that I, THOMAS B. JEFFERY, a citizen of the United States, residing at Chicago, county of Cook, and State of Illinois, have invented certain new and useful Improvements in Vehicle-Tires, which are fully set forth in the following specification, reference being had to the accompanying drawings, forming a part thereof.

The purpose of this invention is to provide an improved elastic tire of the class wherein the elasticity is dependent in part upon air or gas filled cavities in the tire, wherein the gas or air is subjected to compression as the wheel rolls on the ground.

In the drawings, Figure 1 is a section in the plane of rotation of a portion of a wheel-rim and tire embodying my invention. Fig. 2 is a transverse section of such wheel-rim and tire.

A is the wheel-rim, which will be made of any suitable concave form to receive the tire B, which may be circular in transverse outline.

B' B' are cavities in the substance of the tire, such cavities being non-communicating and short relatively to the entire circumference of the wheel. I prefer as the limit of the length of these cavities B' a distance about equal to the extent to which the tire is liable to be flattened at its ground contact under the maximum load which the wheel is designed to carry. The observance of this limit will, in my opinion, give the most effective elasticity to the tire under any load. The theoretical limit of the possible flattening of the tire will obviously be the length of a chord of the outer circumference, which is tangent to the inner circumference of the tire; but of course this limit will never be reached in practice, because it involves compressing the tire to zero in thickness. It is not material whether the air or gas in the non-communicating spaces D is under more than normal pressure or not—that is, whether such cells are distended by the gas which they contain or not.

The advantage of separating the cavities of the tire by the partitions $B^2$ $B^2$ between the non-communicating spaces B' is that whatever the tension of the contained air or gas that tension is increased in each cell at the time that cell is exposed to exterior pressure without materially increasing the tension in any other cell, and that the increase of tension due to the pressure is greater than it would be in a continuous cell or in a large cell in inverse ratio to the capacity of the cell.

The cells in the tire illustrated may be produced in the process of molding or otherwise manufacturing the tire by methods which are familiar in the art of rubber manufacture, and it need not be here explained.

I claim—

1. An integral tire for vehicles, consisting of rubber or other flexible material having distributed throughout its circumferential extent a series of completely inclosed non-communicating cavities occupied by air or gas, substantially as set forth.

2. An integral tire for vehicles, consisting of rubber or other flexible material having distributed throughout its circumferential extent a series of completely inclosed non-communicating cavities occupied by air or gas at normal tension, substantially as set forth.

3. A tire for vehicles, consisting of an integral annulus of rubber or other flexible material having distributed throughout its circumferential extent a series of completely inclosed cavities separated by fixed partitions and thereby rendered non-communicating, such cavities being occupied by air or gas, each of said cavities being small in circumferential extent relatively to the entire circumference of the wheel, substantially as set forth.

In testimony whereof I have hereunto set my hand, at Chicago, Illinois, this 3d day of September, 1890.

THOS. B. JEFFERY.

Witnesses:
W. H. MULLEN,
CHAS. S. BURTON.